Dec. 30, 1941.  C. C. STEWARD  2,267,761
GAS SEPARATION
Filed April 22, 1940  3 Sheets-Sheet 1

Patented Dec. 30, 1941

2,267,761

UNITED STATES PATENT OFFICE 2,267,761

GAS SEPARATION

Clinton C. Steward, Whittier, Calif.

Application April 22, 1940, Serial No. 330,877

19 Claims. (Cl. 62—122)

This invention relates to a process for separating gases and more particularly to a process for separating, from a mixture of paraffinic and olefinic hydrocarbon gases, constituents having closely related boiling points, such, for example, as methane, ethylene, ethane, propylene and butylene. These constituents may be present in gas mixtures resulting, for example, from the conversion of hydrocarbons, as set forth in a co-pending application of R. E. Lidov, Ser. No. 327,469 filed April 2, 1940.

An object of the invention is to provide a novel and improved process and system of the type above indicated.

Another object is to provide a gas separation system of the above type which is suited to large scale commercial operation.

Another object is to provide a system of the above type which is efficient as to heat and power requirements.

Another object is to provide a novel and improved system for compressing a gas and liquid mixture to a high pressure.

Another object is to provide an improved and efficient refrigerating system for refrigerating the low temperature fractionating zones.

Various other objects and advantages will be apparent as the nature of the invention is more fully disclosed.

In accordance with the present invention, the gaseous mixture which may contain various gases such as hydrogen, methane, ethylene, ethane, propylene, and butylene, derived from any convenient source, for example, as a product in certain hydrocarbon cracking processes, is treated under suitable conditions of temperature and pressure for the successive removal of the various constituents.

Any normally liquid constituent may first be removed by separation in a scrubber, after which the gas mixture in vapor phase is compressed in a plurality of stages to the high pressure required for the fractional separation of the methane and lower boiling constituents from the higher boiling constituents.

In one embodiment of the invention this compression is effected in a plurality of stages, after each of which the heat of compression is removed by a suitable inter-cooler and any liquids which may be condensed out are separated from the vapors so as to prevent the liquid from being passed through the compressors. The highly compressed vapors are then thoroughly dehydrated to remove traces of moisture therefrom after which they are cooled and the ethylene and remaining higher boiling constituents are fractionally separated from the methane and lower boiling constituents in a suitably controlled fractionating zone.

After the removal of the methane and lower boiling constituents as an overhead vapor from this zone, the liquid fraction is supplied to a second fractionating zone which is operated at a lower pressure and a higher temperature than the first zone and is suited to the removal of the ethylene as an overhead vapor. The liquid fraction from this fractionating zone which contains the ethane and higher boiling constituents is then passed to a third fractionating zone operated under conditions of temperature and pressure to remove the ethane as an overhead vapor. The ethane may be combined with the methane and lighter gases from the first fractionating zone for use as fuel gas. The ethane may also be used as a refrigerant for the first fractionating zone as will be described.

The liquid fraction from the de-ethanizing zone above mentioned is then supplied to a fourth fractionating zone which is operated under conditions of temperature and pressure to remove the propylene as an overhead fraction. The remaining liquid fraction, which consists of butylene and higher boiling components, is then supplied to a fifth fractionating zone operated under conditions of temperature and pressure to remove the butylene as an overhead fraction, leaving the higher boiling components in the liquid fraction which may be combined with the liquid which has been previously separated from the gases in the scrubber and treated in accordance with the particular characteristics thereof. The liquid, for example, may contain an aromatic fraction boiling within the motor fuel range, in which event it may be supplied to a suitable treating unit for conversion to motor fuel.

Due to the low temperatures required in the first fractionating zone (the de-methanizing zone) refrigeration may be effected by evaporation of liquid ethane which is taken from a later stage in the process. The ethane may be condensed by a second refrigerant, such as ammonia, and may be used in a closed cycle, including an evaporator in which the liquid ethane is evaporated in heat transfer relationship with the vapors to be condensed.

The ammonia may likewise be used in a closed cycle which may include a pair of evaporators, one of which is used for condensing the ethane as above mentioned and the other of which may be used for fractionally condensing the vapors from the top of the second fractionating zone (ethylene rectifying zone) in which the ethylene is separated and removed.

In accordance with the present invention, the use of commercially impractical temperatures for the de-methanizing zone is avoided by operating this zone at the maximum pressure consistent with preventing the formation of a retrograde phase which, in the case of the materials under consideration, begins to appear when the pseudo-critical pressure for the gas mixture is approached. The ethylene rectification zone and the de-ethanizing zone are operated at pressures only enough lower than that of the de-methanizing zone to ensure the desired flow without requiring additional pumps or compressors. In this way, the temperatures from these zones are also maintained within commercially practical limits. The propylene and butylene rectifying zones are operated at a condenser outlet temperature such that water cooling may be used, thereby decreasing the operating cost, and the pressures used may correspond to the requirements at the selected temperatures. In this way the system is operated at progressively decreasing pressures so that the necessity for recompressing or pumping at intermediate points is avoided. Also the temperatures progressively increase in such a manner that the heat requirements are reduced to a minimum.

Various other features and advantages will become apparent as the nature of the invention is more fully disclosed and are pointed out more particularly in the claims appended hereto. The invention itself, however, may be better understood by referring to the following description, taken in connection with the accompanying drawings, in which a specific embodiment thereof has been set forth for purposes of illustration.

In the drawings, Figs. 1 to 3, taken in order of numbering, represent diagrammatically a gas separation system embodying the present invention.

Figure 1:
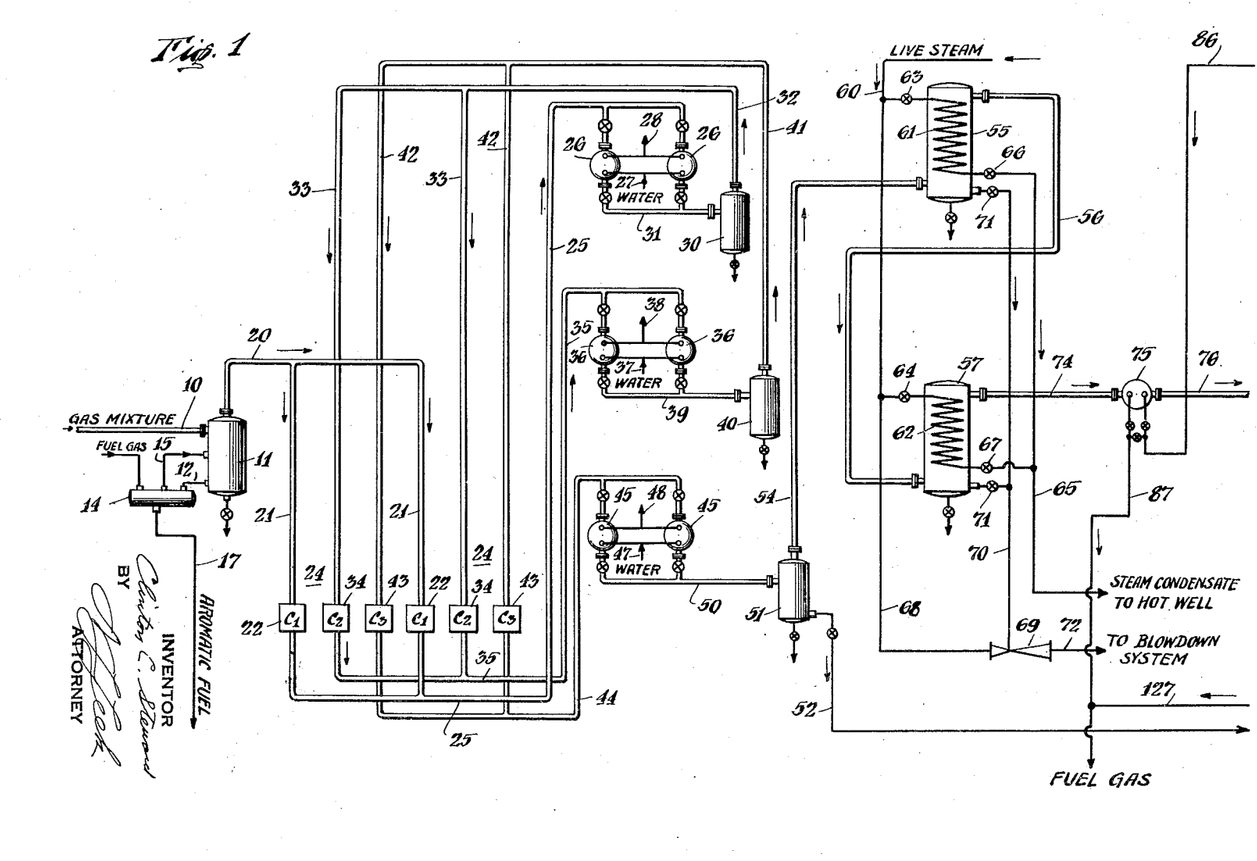

Referring to the drawings more in detail, the gas mixture, consisting of the various gases above mentioned, is supplied through a gas supply pipe 10 to a scrubber 11 which is adapted to remove any remaining liquid which may be present in the gas mixture. Any liquid from the scrubber 11 may be trapped through a line 12 to a receiver 14 from which it is blown out by a light gas, such as fuel gas, obtained from a later stage of the process. The vapors from the receiver 14 are returned to the scrubber 11 through a line 15. The liquid from the receiver 14, if the gas mixture is obtained from a conversion process as set forth in the Lidov application above mentioned or from a similar process, may comprise an aromatic motor fuel fraction. This may be removed through a line 17 for suitable treatment.

The vapors from the scrubber 11 are passed through a line 20 and branch lines 21 through the first stages 22 of a pair of three-stage compressors 24 from which they are passed through a line 25 to a pair of interstage coolers 26 which may be of the water-cooled type, having a water feed line 27 and a water discharge line 28. The coolers 26 remove the heat of compression from the gases and any condensed liquid is removed in a receiver 30 which is connected to the coolers 26 by a line 31.

From the receiver 30 the gases are passed through a line 32 and branch lines 33 to the second stages 34 of the three-stage compressors 24 from which they are passed through a line 35 to a pair of interstage coolers 36 similar to the coolers 26. These coolers 36 may comprise water coolers having a water feed line 37 and a water discharge line 38. The cooled gases are then supplied by a line 39 to a receiver 40 in which any condensed liquid is removed.

The gases from the receiver 40 are passed through a line 41 and branch lines 42 to the third stages 43 of the three stage compressors 24 from which they are passed through a line 44 to coolers 45 which are similar to the coolers 26 and 36 above mentioned and may be provided with a water supply line 47 and a water discharge line 48.

From the coolers 45 the gases are passed through a line 50 to a receiver 51 in which any condensed liquid is removed. Liquid from the receivers 30 and 40 may be introduced by suitable pumps, not shown, into the receiver 51. The liquid from the receiver 51 may be removed through line 52 to be re-introduced into the system at a later point, as will be described.

The highly compressed vapors from the receiver 51 are passed through a line 54 to a first dehydrator 55 and thence through a line 56 to a second dehydrator 57. The dehydrators may contain dehydrating material of any suitable type, such, for example, as silica gel, di-ethylene glycol or activated alumina dehydrators. The dehydrating agent may be reactivated by live steam supplied from a line 60 to coils 61 and 62 located respectively in the dehydrators 55 and 57 and controlled by individual valves 63 and 64. After passage through the coils 61 and 62, the steam is removed through an exhaust line 65 which may lead to a steam condenser, a hot well or the like. The steam outlet from the coils 61 and 62 may be controlled by individual valves 66 and 67.

For operating the dehydrators at a reduced pressure during reactivation, the steam may be supplied through a line 68 to a jet 69, the low pressure point of which is connected by a line 70 and valves 71 to the dehydrators above mentioned. Exhaust steam from the jet 69 may be passed through a line 72 to a blow down system or to a condenser.

Two dehydrators have been shown as connected in series in order to effectively remove any traces of moisture from the highly compressed vapors. Such removal is necessary because of the low temperature to which the vapors are to be cooled in the de-methanizer zone. It is to be understood that additional dehydrators may be provided for use when the de-hydrators 55 and 57 are removed from stream for reactivation purposes. Such additional de-hydrators have been omitted from the drawing for clearness of description.

Figure 2:
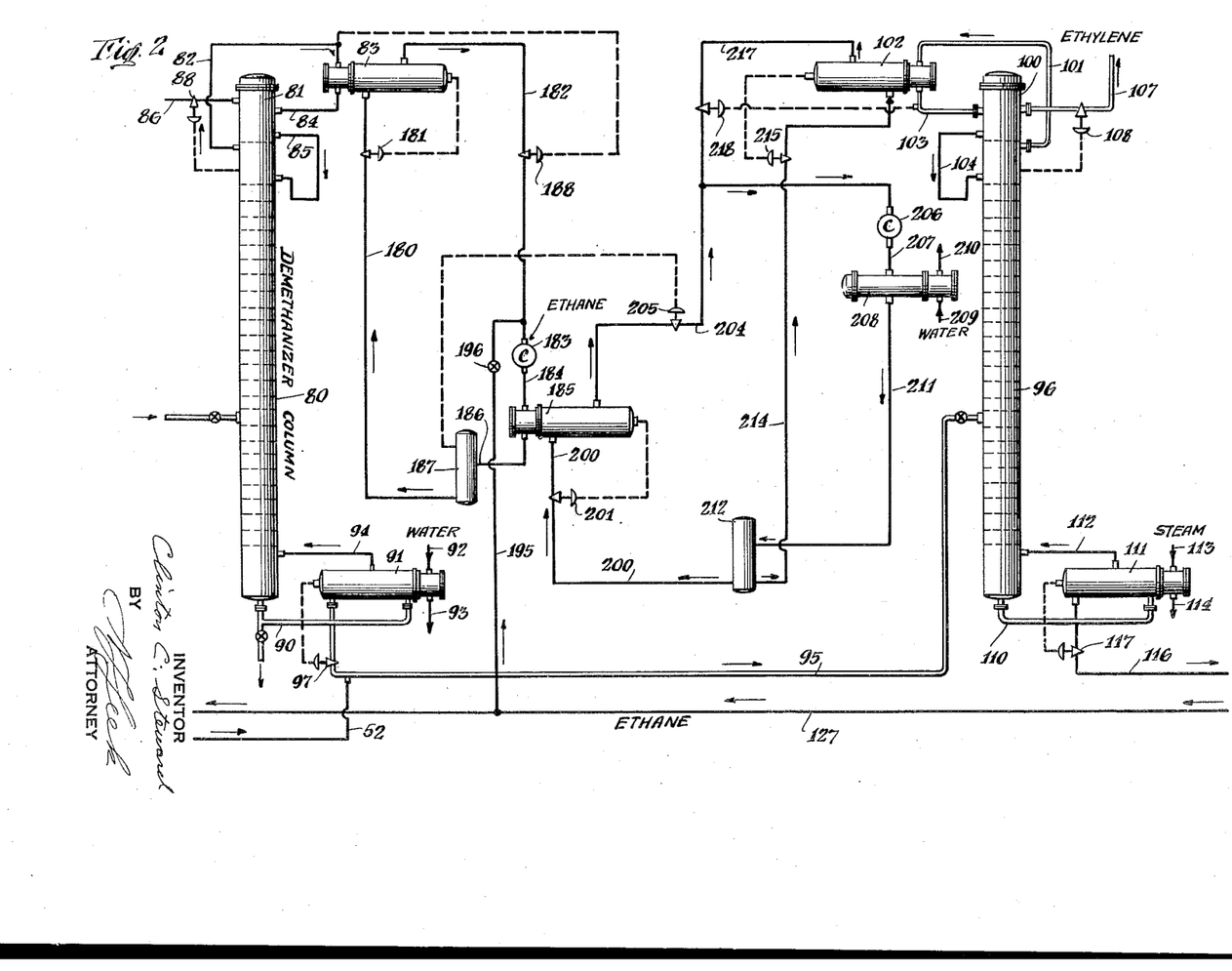

The highly compressed and dehydrated vapors from the dehydrator 57 are now passed through a line 74 to a heat exchanger 75 wherein they are pre-cooled for introduction through a line 76 to a fractionating column 80, herein referred to as a de-methanizer column, which is operated at a temperature and pressure suited to the fractional separation of the methane and lower boiling constituents, such as hydrogen, as an overhead vapor.

Vapors from the top of the column 80 are passed through a line 82 to a low temperature reflux condenser 83 from which they are passed through a line 84 to a receiver 81. The condensate from the receiver 81 is returned through a line 85 to the top of the column 80. The separated vapor, which consists of methane and lower boiling constituents, such as hydrogen, is removed from the receiver 81 through a line 86 by which it is supplied to the heat exchanger 75 and used for pre-cooling the incoming vapors as above mentioned. After passage through the heat exchanger 75, the vapors are removed from the system through a line 87 and may be used for fuel gas or supplied to storage. The pressure in the column 80 may be controlled by an automatic valve 88 in the line 86.

The liquid from the base of the demethanizer column 80 is supplied through a pipe 90 to a reboiler 91, having a water feed line 92 and a water discharge line 93. The vapors from the reboiler 91 are returned to the column 80 through a line 94.

The liquid from the reboiler 91, together with liquid from the line 52, above described, is passed through a line 95 to a second fractionating column 96, referred to herein as an ethylene rectifier, which is operated at temperatures and pressures suited to remove the ethylene as an overhead vapor. The line 95 may be provided with a liquid level control valve 97 adapted to maintain a constant level in the reboiler 91 and associated apparatus and to pass the liquid at a lower pressure to the column 96.

Vapors from the top of the column 96 are passed through a line 101 to a low temperature reflux condenser 102 and thence through a line 103 to a receiver 100. The liquid condensate from the receiver 100 is returned by a line 104 to the top of the column 96. The vapors, principally ethylene, are removed from the receiver 100 by a line 107. The low temperature condensers 83 and 102 are refrigerated in a manner to be later described. The pressure in the column 96 is controlled by an automatic valve 108 in the line 107.

The liquid fraction is passed from the base of the ethylene rectifier column 96 through a line 110 to a reboiler 111 from which the vapor is returned through a line 112 to the column 96. The reboiler 111 may be heated by steam supplied from a feed line 113 and discharged through a line 114.

The liquid fraction from the reboiler 111 is passed through a line 116 to a third fractionating column 120, herein referred to as a de-ethanizer column, which may be operated under suitable conditions to separate the ethane as an overhead vapor. A liquid level control valve 117 may be provided in the line 116 to maintain desired conditions in the column 96 and to pass the liquid at a reduced pressure to the column 120. The valve 117 may be automatically operated in accordance with the liquid level in the reboiler 111.

Vapors from the top of the column 120 are passed through a line 122 to a reflux condenser 123 from which they are passed through a line 124 to a receiver 121. The condenser 123 may be supplied with a suitable heat exchange fluid, such as water, through a feed line 125. The condensate from the receiver 121 may be returned through a line 126 to the top of the column 120. The vapor from the receiver 121, principally ethane, is removed through a line 127 and may be used as such or may be combined with the ethane from the line 87 for use as fuel gas. The pressure within the column 120 may be controlled by an automatic valve 128 in the line 127.

The receivers 81, 100 and 121 have been shown as built in the tops of the de-methanizer column 80, the ethylene rectifier 96 and the de-ethanizer column 120, respectively, and the corresponding reflux condensers 82, 102 and 123 as located above the column tops in order to avoid the necessity for pumping the cold, high pressure reflux. They may be otherwise located, however, if desired.

Figure 3:
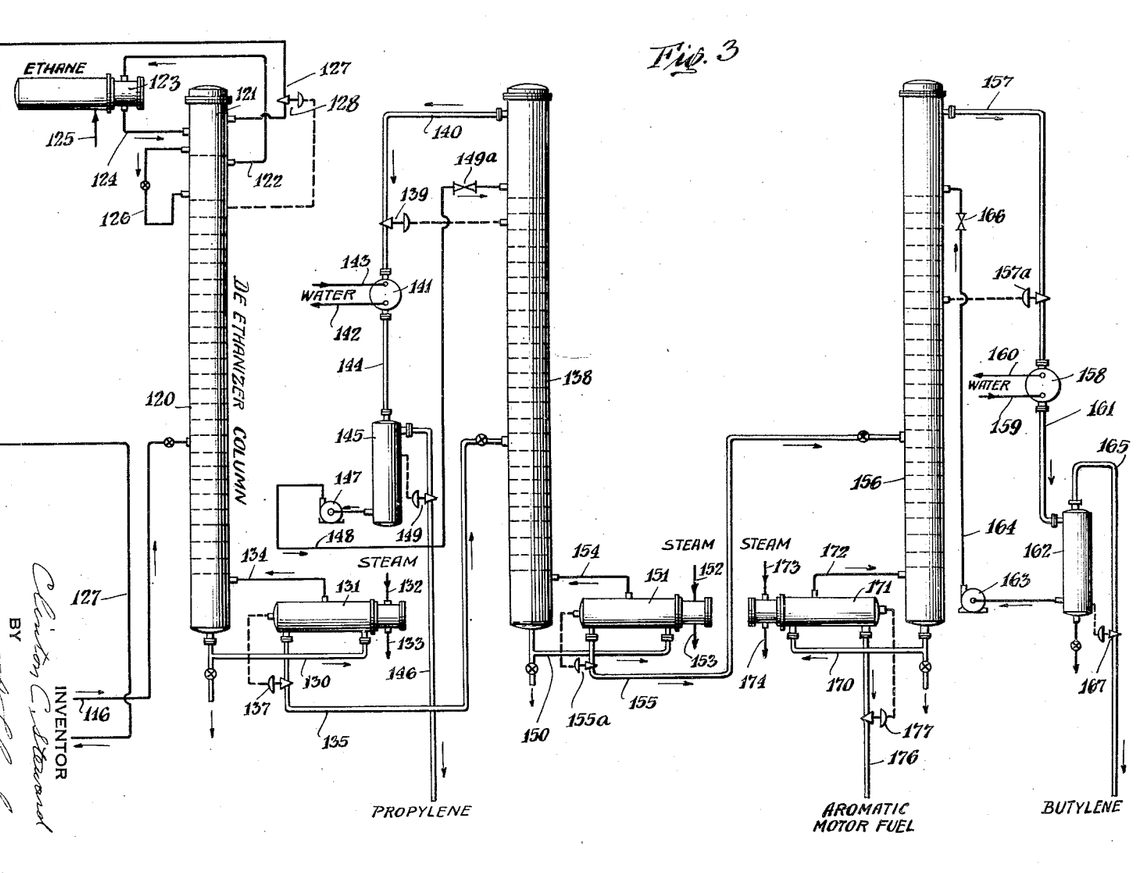

The liquid fraction from the de-ethanizer column 120 is passed through a line 130 to a reboiler 131 having a steam supply line 132 and a steam discharge line 133. The vapors from the reboiler 131 are returned to the column 120 through a line 134. The liquid fraction is passed through a line 135 to a fractionating column 138, referred to herein as a propylene rectifier, which is operated under conditions to separate the propylene as an overhead vapor. The line 135 may be provided with an automatic pressure reducing valve 137 controlled in accordance with the liquid level in the reboiler 131.

The overhead vapors from the column 138 are passed through a line 140 and an automatic pressure control valve 139 adapted to maintain the desired pressure in the column 138 to a reflux condenser 141 which may comprise a water cooler having a water feed line 142 and a water discharge line 143. From the condenser 141 the fluid passes through a line 144 to a receiver 145 which is adapted to remove the condensate from the vapors, principally propylene, which are then removed from the system through a line 146 having a pressure control valve 149. The liquid reflux from the receiver 145 is pumped by a pump 147 through a line 148 and a check valve 149a to the top of the column 138 for temperature control purposes.

The liquid fraction from the bottom of the propylene rectifier column 138 is passed through a line 150 to a reboiler 151 having a steam feed line 152 and a steam discharge line 153. The vapors from the reboiler 151 are returned from the column 138 through a line 154.

The liquid fraction from the reboiler 151 is passed through a line 155 and an automatic pressure reducing valve 155a to a fractionating column 156, referred to herein as a butylene rectifier, operated under conditions to separate the butylene as an overhead fraction. The overhead vapors from the column 146 are removed through a line 157 and automatic pressure control valve 157a to a reflux condenser 158 which may comprise a water cooler having a water feed line 159 and a water discharge line 160. The reflux is passed through a line 161 to a receiver 162, the condensate from which is pumped by a pump 163 through a line 164 and a check valve 166 to the top of the column 156 for temperature control purposes. The vapors from the separator 162, consisting principally of butylene, are removed through a line 165 and an automatic pressure control valve 167.

The liquid fraction from the bottom of the butylene rectifier column 156, consisting of substituents heavier than butylene, such, for example, as aromatic liquid hydrocarbons in the motor fuel boiling range, is passed through a line 170 to a reboiler 171, the vapors from which are returned to the column 156 through a line 172. The reboiler may have a steam feed line 173 and a steam discharge line 174. The liquid fraction from the reboiler 171 is removed from the system through a line 176 and an automatic pressure control valve 177 and may be suitably treated in any convenient manner depending upon the constituents thereof. It may, for example, be combined with the liquid removed through the line 17 from the absorber 14.

The condensers 83 and 102 may comprise heat exchangers arranged with the hydrocarbon vapors passing through tubes and cooled by an evaporating liquid refrigerant on the outside of the tubes. The condenser 83 may be cooled by a binary refrigeration cycle, the first stage of which may also be used to cool the condenser 102.

In the embodiment shown, a low temperature refrigerant comprising, for example, liquid ethane or other hydrocarbon may be supplied to the condenser 83 through a line 180 having an automatic valve 181 to control the liquid level in the condenser 83. After evaporating in the condenser 83, the vapor may be removed through a line 182, recompressed by a compressor 183 and supplied through a line 184 to a condenser 185 wherein it is cooled and condensed by heat exchange with a second evaporating refrigerant such as ammonia. From the condenser 185 the cold liquid ethane is passed through a line 186 to a receiver 187 from which it is returned through the line 180 to the condenser 83. The rate of evaporation in the heat exchanger 83 may be controlled by an automatic control valve 188 actuated in accordance with the temperature of the vapors in the line 82. Ethane for charging the above system may be taken from the line 127 through a line 195, controlled by a valve 196, which communicates with the line 182 on the suction side of the compressor 183. Inasmuch as the ethane is used in a closed system, however, it is only necessary to supply the original charge thereto from the line 195 and to make up for any leakage or other loss which may thereafter take place.

The condenser 185 is cooled by evaporating ammonia supplied from a liquid line 200 having an automatic control valve 201 actuated to maintain a predetermined liquid level in the condenser. The ammonia vapor is removed through a line 204 which may be controlled by an automatic valve 205 actuated in accordance with the temperature of the liquid in the receiver 187. The ammonia vapors are recompressed in a compressor 206 and are then supplied through a line 207 to a condenser 208, which may comprise a water cooler having a water feed line 209 and a water discharge line 210. The cold liquid ammonia is then passed through a line 211 to a receiver 212 from which it is returned by the line 200 to the condenser 185.

The liquid ammonia from the receiver 212 also passes through a line 214 and an automatic liquid level control valve 215 to the condenser 102 and serves as the refrigerant therefor. The ammonia vapor is removed from the exchanger 102 through a line 217 and is returned thereby to the line 204 leading to the compressor 206. The rate of evaporation at the condenser 102 may be controlled by an automatic valve 218 actuated in accordance with the temperature in the line 103.

The operation of this system may be best explained by reference to a specific example. It is to be understood, however, that the figures given are representative only and that the invention is not to be construed as limited to the following example:

The invention may be used for separating the components of a gas mixture containing, for example, hydrogen, methane, ethylene, ethane, propylene, butylene and a minor portion of heavier constituents, such as aromatic hydrocarbons of the nature of benzol, toluol and xylol. Such a mixture may be obtained from a conversion process of the type disclosed in the Lidov application above mentioned. This gas mixture is supplied through the line 10 at approximately atmospheric pressure and at a temperature of about 90° F. At this temperature the various olefines above mentioned up to and including butylene, are in the gaseous form. Materials heavier than butylene, which are in liquid form, are removed in the scrubber 11. The liquid from the absorber 14 may be withdrawn from the system by the trap 14 and further treated or combined with the liquid from the final stage of the process as above described. The lines 12 and 15 leading to the trap 14 are normally open. When liquid accumulates in the trap, however, it is removed by closing valves (not shown) in the lines 12 and 15 and blowing the liquid out into the line 17 by pressure derived from the fuel gas line 16.

The gases consisting of butylene and lighter constituents are now passed at about 90° F. to the first stages 22 of the compressors 24 in which they are raised to a pressure of about 25 lbs. The temperature may also be raised to about 200° F. They are now cooled in the water coolers 26 to remove the heat of compression and supplied to the receiver 30 at about 25 lbs. pressure and a temperature of about 90° F. for the removal of any condensate. The vapors are then passed to the second stage 34 of the compressors 24 where they are raised to a higher pressure, such as 140 lbs., the temperature again being raised to about 200 F. The vapors are again cooled in the cooler 36 to a temperature of about 90° F. and the condensate separated in the receiver 40. The vapors are now passed to the third stages 43 of the compressor 24 wherein they may be compressed to about 600 lbs., the temperature again being raised to about 200° F. They are now cooled in the water coolers 45 to a temperature of about 90° F., the condensate being removed through the line 52 and reintroduced into the liquid stream entering the ethylene rectifier 80.

The vapors, now at a pressure of about 600 lbs. and at a temperature of 90° F., are thoroughly dehydrated in the dehydrators 55 and 57, after which they are cooled in the heat exchanger 75 to a temperature of about 30° F. at which temperature and pressure they are introduced into the de-methanizer column 80. The reflux condenser 83 is operated with an outlet temperature of −90° F. receiving vapors from the column 80 at about −60° F. At this temperature and pressure, a satisfactory separation of the methane and lighter constituents from the ethylene and heavier constituents is obtained. In the above embodiment the de-menthanizer column is operated at a high pressure so as to reduce the required refrigeration to the lowest possible value suited to an efficient separation. The pressure should be as close to the pseudo-critical pressure of the methane mixture as commercial operations permit, but should not be so high as to cause formation of a retrograde phase. A pressure of 600 lbs. has been selected with this consideration in view.

The refrigeration of the vapors in the reflux condenser 83 is shown as taking place in a binary refrigeration cycle. The condenser 83 may be supplied with liquid ethane which may have a temperature of about −15° F. at a pressure of about 180 lbs. The ethane is evaporated on the shell side of the condenser at a pressure of about 18 lbs. and at a rate to produce a temperature therein of about −100° F. The vapor is withdrawn from the condenser 83, recompressed by the compressor 183 and is then cooled and liquified in the condenser 185 at a temperature of about −15° F., as above mentioned.

The condenser 185 may be cooled by liquid ammonia which may be supplied through the line 200 at a pressure of about 212 lbs. and a temperature of about 100° F. and may be evaporated in the heat exchanger at a pressure of about 16 lbs. at a temperature of about −25° F. The ammonia vapor may be recompressed by the compressor 206 and cooled and liquified in the water condenser 208. The liquid ammonia is also supplied to the reflux condenser 102 associated with the ethylene rectifier column 96 and may be evaporated therein to produce the required low temperature for cooling the overhead ethylene vapors.

The reboiler 91 may be operated at a temperature of about 70° F. and at a pressure of about 600 lbs. by a suitable supply of warm water through the feed line 92. This temperature at the above mentioned high pressure, is adapted to effect a further removal of any remaining methane and lighter constituents from the liquid at the base of the de-methanizer column 80.

The ethylene rectifier 96 is operated at as high a pressure as possible while still obtaining the desired flow from the reboiler 91. This may, for example, comprise a pressure of about 550 lbs., the valve 97 being set for a pressure drop of about 50 lbs. The reflux condenser 100 at the top of the ethylene rectifier may be operated at an outlet temperature of about 30° F., receiving the vapors from the column 96 at a temperature of about 45° F. This condenser 102 is cooled by evaporating ammonia as above mentioned, the rate of evaporation being controlled in accordance with the temperature in the line 103 so as to maintain the vapors at the desired outlet temperature.

The reboiler 111 at a pressure of 550 lbs. may be operated at a temperature of about 120° F. to remove any remaining ethylene and lighter constituents.

The de-ethanizer column 120 is operated at as high a pressure as possible consistent with a free flow from the reboiler 11 such, for example, as a pressure of about 500 lbs. The liquid is accordingly introduced into this de-ethanized column 120 through the line 116 at a temperature of 120° F. and at a pressure of 500 lbs. The reflux condenser 121 at the top of the column 120 may be operated at an outlet temperature of 90° F., receiving vapors from the column at about 100° F.

The reboiler 131 may be operated at a pressure of 500 lbs. and at a temperature of 140° F. which is adapted to effect a removal of further quantities of ethane and lighter products.

The propylene rectifier column is preferably operated under conditions such that a convenient temperature may be obtained at the outlet of the reflux condenser 141. In the present embodiment this outlet temperature may be of the order of 90° F. Under these conditions, a pressure of about 200 lbs. is suited to the separation of the propylene as an overhead vapor. The liquid from the reboiler 131 is accordingly supplied to the propylene rectifier column 138 at a temperature of about 120° F. and at a pressure of about 200 lbs. The overhead vapors in the line 140 which may have a temperature of about 110° F. are passed through a valve 139 adapted to maintain the desired pressure on the propylene rectifier column and to reduce the gas pressure in the condenser to about 190 lbs. The vapors are then cooled in the condenser 141 to a temperature of about 90° F. and are separated in the receiver 145 at about this temperature and at a pressure of about 180 lbs. The reflux from this receiver is pumped through the line 148 and check valve 149a to the top of the column for temperature control purposes, the propylene vapor being removed through the line 146.

The reboiler 151 may be operated at a temperature of about 180° F., which is suited to the removal of further quantities of propylene or lighter constituents.

In order to operate the butylene rectifier column 156 at about the same temperature range as the propylene rectifier, the liquid leaving the reboiler 151 is reduced in pressure by the valve 155a to about 150 lbs. and is supplied at this pressure and at a temperature of about 180° F. into the butylene rectifier column through the line 155. The overhead from this column at a temperature of about 110° F. is passed through a back pressure valve 157a which may reduce the pressure to about 140 lbs. to the condenser 158 wherein it is cooled to about 90° F. and is separated in the receiver 162 at this temperature and at a pressure of about 130 lbs., the condensate being pumped back to the top of the column for temperature control purposes.

The reboiler 171 may be operated at a temperature of about 200° F. for the removal of any further content of butylene and lighter constituents which are returned to the column 146 through the line 172. The remaining liquid, which may contain the aromatic fraction above-mentioned, is removed from the reboiler through the line 176 and may be treated as desired. In certain instances this fraction may be treated to produce a high ani-knock motor fuel.

In another embodiment, the operating temperatures and pressures may be selected in accordance with the following table, it being understood that the particular conditions selected in each instance will depend upon the contents of the gases and the degree of purity required for the various products:

De-methanizer column:
    Pressure__________________pounds__ 600
    Temperature—
        Overhead __________________°F__ −30
        Base______________________°F__ 75
        Reflux condenser outlet______°F__ −90
Ethylene rectifier:
    Pressure__________________pounds__ 550
    Temperature—
        Overhead __________________°F__ 35
        Base______________________°F__ 192
        Reflux condenser outlet______°F__ 30
De-ethanizer column:
    Pressure__________________pounds__ 525
    Temperature—
        Overhead __________________°F__ 95
        Base______________________°F__ 230
        Reflux condenser outlet______°F__ 90
Propylene rectifier:
    Pressure__________________pounds__ 250
    Temperature—
        Overhead __________________°F__ 110
        Base______________________°F__ 235
        Reflux condenser outlet______°F__ 90
Butylene rectifier:
    Pressure__________________pounds__ 145
    Temperature—
        Overhead __________________°F__ 120
        Base______________________°F__ 275
        Reflux condenser outlet______°F__ 90

In the above-described system, the operating conditions are such that the various constituents are removed in a commercial degree of purity and are suitable for commercial use. It is to be understood that if the ethane content of the gas mixture is low or if the presence of ethane in the propylene fraction as well as in the liquid fraction removed from the base of the propylene rectifier is not harmful, the de-ethanizer column may be omitted and the propylene rectifier may be operated under conditions to split the ethane between the overhead vapor fraction and the bottom liquid fraction. If the quantity of ethane is sufficiently large, however, it is commercially profitable to remove the same separately by the use of a de-ethanizer column, as above-mentioned, and to use the ethane as fuel gas or for supplying other heat requirements of the plant.

It is to be noted that the reflux condensers have been located at the top of the de-methanizer column, the ethylene rectifier and the de-ethanizer column. This avoids pumping of the low temperature, high pressure condensate and provides an efficient arrangement. The reflux condensers in the case of the propylene and butylene rectifiers are mounted over the receivers so as to avoid additional construction costs which would otherwise be required and the condensate is pumped to the top of the columns.

The gases are shown as compressed in three stages because of the high pressure which is required for the de-methanizer column. This also permits the heat of compression to be removed after each stage, thereby simplifying the control problem. It is to be understood that three stages are shown for purposes of illustration and that the arrangement may be modified as desired. It is also to be understood that two sets of compressors have been shown merely for purposes of illustration. The number of sets of compressors will of course depend on the capacity of the compressors and on the quantity of material which is to be passed therethrough.

The two-stage refrigerating system shown for cooling the vapors in the condensers 100 and 81 at the top of the ethylene rectifier and the demethanizer column respectively provides an efficient system in which the ammonia is used for cooling the vapors at the top of the ethylene rectifier. The secondary refrigerant may comprise ethane, ethylene or other suitable hydrocarbon which is adapted to evaporate at the low temperatures above-mentioned.

The reflux condenser outlet temperatures and the top column temperatures are preferably selected at about the dew point of the vapors at the respective pressures at those points. The reboiler temperatures may be such that the sum of the partial pressures of the various constituents about equals the total pressure on the system at the corresponding points. In this way a selective separation in about the ratios of the partial pressures takes place. It is to be understood that the above figures are given as examples only and that variations in operating conditions may be made as will be apparent to a person skilled in the art.

Obviously, suitable back pressure valves may be incorporated in the various overhead vapor lines and at suitable other points to maintain the desired pressure conditions. In the case of the propylene rectifier and the butylene rectifier, a back pressure valve is positioned in the vapor line between the column and the reflux condenser in order to prevent changes in condenser conditions from affecting the operation of the system and to facilitate the proper system control. Such valves of course cannot be used with the demethanizer column, the ethylene rectifier and the de-ethanizer column where gravity flow is used to return the reflux to the columns. If desired, however, such valves may be used and suitable pumping means provided for the reflux.

The reflux ratios are dependent upon various operating factors such as size and number of trays, vapor velocity, etc. In the present embodiment, the various columns are designed as nearly identical as possible for constructional reasons and the operation is controlled by varying the reflux ratio. However, in the case of the ethylene rectifier the number of trays should be increased so as to keep to a minimum the ethane content of the overhead vapors without requiring excessive refrigeration equipment.

While the novel cooperative relationship between the various steps of the process combine to effect an improved, efficient and commercially practical separation system, many of the noved features are adapted to use in other combinations and in other types of processes and for the treatment of other materials. Various other features and advantages of the invention both in the individual steps and in the various combinations thereof will be readily apparent to those familiar with the art. It is accordingly to be understood that the invention is not to be restricted to the specific embodiments herein set forth, but is only to be restricted in accordance with the scope of the following claims.

What is claimed is:

1. The process for separating gaseous olefines from gas mixtures containing said olefines and other hydrocarbon gases, which comprises compressing the gases to a high pressure suited for introduction into a fractionating zone operated at temperatures and pressures to separate methane and lighter components as an overhead vapor, cooling the compressed gases to remove the heat of compression, removing the liquid condensate, dehydrating the gases, further cooling the same to a temperature suited for introduction into said fractionating zone, introducing said gases into said zone, removing the methane and lighter hydrocarbon gases as an overhead vapor, introducing the liquid fraction from said last zone together with said condensate into a second zone operated under conditions suited to the separation of ethylene as an overhead fraction, removing the ethylene from the system as a final product, introducing the liquid fraction from the last zone into a third fractionating zone operated under conditions to separate the propylene as an overhead fraction, removing the propylene from the system as a second product, introducing the liquid fraction from the last zone into a fourth fractionating zone operated under conditions to separate the butylene as an overhead fraction, removing the butylene from the system as a third product, and removing the remaining liquid fraction from said last zone for further treatment in accordance with the nature thereof.

2. The process according to claim 1 in which the compression of the gases is effected in a plurality of stages and the heat of compression is removed and the condensate separated after each stage so as to avoid passage of entrained liquid through the compressors.

3. The process according to claim 1 in which the compression of the gases is effected in a plurality of stages and the heat of compression is removed and the condensate separated after each stage so as to avoid passage of entrained liquid through the compressors, and the separated condensate is introduced into the second fractionating zone for fractionation therein.

4. The process according to claim 1 in which the dehydration takes place in two stages, each of which is normally capable of removing the entire moisture content, whereby complete elimination of the moisture is ensured.

5. The process according to claim 1 in which dehydration is effected in contact with an absorbent material requiring periodic reactivation, and steam is supplied to the dehydration material for heating the same to reactivation temperature and a reduced pressure is obtained during reactivation by passing the steam to a jet connected to apply suction to said material.

6. The process according to claim 1 in which the first fractionating zone is operated at a pressure near the point at which a retrograde phase tends to appear and at an overhead temperature of about the dew point of the vapors at the above pressure.

7. The process according to claim 1 in which the first fractionating zone is operated at a pressure near the point at which a retrograde phase tends to appear, at an overhead temperature of about the dew point of the vapors at the above pressure, and at a bottom temperature such that the sum of the partial pressures of the various components about equals the zone pressure.

8. The process according to claim 1 in which the first fractionating zone is operated at a pressure near the point at which a retrograde phase tends to appear and the second zone is operated at a pressure only enough lower than that of the first zone to ensure flow of the materials thereto without intermediate pumping.

9. The process according to claim 1 in which the first fractionating zone is operated at a pressure near the point at which a retrograde phase tends to appear and the remaining zones are operated at progressively lower pressures suited to cause flow of materials without intermediate pumping, the second zone being operated at a pressure approaching that of the first zone and the third and fourth zones being operated at a pressure suited to remove the selected overhead vapors at a temperature of about 110° F.

10. The process according to claim 1 in which the first fractionating zone is operated at a pressure near the point at which a retrograde phase tends to appear and the remaining zones are operated at progressively lower pressures suited to cause flow of materials without intermediate pumping, the second zone being operated at a pressure approaching that of the first zone and the third and fourth zones being operated at a pressure suited to remove the selected overhead vapors at a temperature of about 110° F., all of said zones being operated at a top temperature corresponding to about the dew points of the respective overhead vapors and at a bottom temperature such that the sum of the partial pressures of the components about equals the total zone pressure whereby vaporization takes place in about the ratio of the vapor pressures of the components.

11. The process according to claim 1 in which the first fractionating zone is operated at a pressure near the point at which a retrograde phase tends to appear and the second zone is operated at a pressure only enough lower than that of the first zone to ensure flow of the materials thereto without intermediate pumping, and the required low overhead temperatures are obtained in the first two zones by refrigeration in a cycle which comprises cooling the vapors from said first zone in heat exchange relationship with an evaporating liquid refrigerant in a reflux condensing zone, recondensing said refrigerant by heat exchange with a second evaporating liquid refrigerant, cooling the overhead vapors from said second zone by heat exchange with said second evaporating liquid refrigerant in a reflux condensing zone, and recondensing said second refrigerant by heat exchange with cold water.

12. The method of refrigerating the overhead vapors from first and second fractionating zones operating at different low overhead temperatures which comprises cooling the vapors from said first zone in heat exchange relationship with an evaporating liquid refrigerant in a reflux condensing zone, recondensing said refrigerant by heat exchange with a second evaporating liquid refrigerant, cooling the overhead vapors from said second zone by heat exchange with said second evaporating liquid refrigerant in a reflux condensing zone, and recondensing said second refrigerant by heat exchange with cold water.

13. The process according to claim 1 in which the fractionating zones are operated at about the following temperatures and pressures:

First zone:
    Pressure ______________________pounds__ 60
    Overhead temperature_____________°F__ −60
    Bottom temperature _______________°F__ 70
Second zone:
    Pressure ______________________pounds__ 550
    Overhead temperature_____________°F__ 45
    Bottom temperature _______________°F__ 120
Third zone:
    Pressure ______________________pounds__ 200
    Overhead temperature _____________°F__ 110
    Bottom temperature _______________°F__ 180
Fourth zone:
    Pressure ______________________pounds__ 150
    Overhead temperature _____________°F__ 110
    Bottom temperature _______________°F__ 200

14. In the process according to claim 1, the additional step which comprises introducing the liquid fraction from the second fractionating zone into an additional fractionating zone operated under conditions suited to the separation of ethane as an overhead fraction, and introducing the liquid fraction from said last zone into said third fractionating zone.

15. The process for separating gaseous olefines from gas mixtures containing said olefines and other hydrocarbon gases which comprises removing any entrained liquids from said gases, compressing said gases to a pressure of about 600 lbs. removing the heat of compression and separating any condensate therefrom, cooling the gases to a temperature of about 30° F. and introducing the same at the above temperature and pressure into a first fractionating zone, maintaining in said zone an overhead temperature of from −30° F. to −60° F. and a bottom temperature of from 70° F. to 75° F., said temperatures and pressures being suited to the separation of methane and low boiling constituents as an overhead fraction, reducing the pressure of the liquid fraction from the bottom of said zone to about 550 lbs. and introducing the same into a second fractionating zone, maintaining in said last zone an overhead temperature of from 35° F. to 45° F. and a bottom temperature of from 120° F. to 192° F., said temperatures and pressures being suited to the separation of ethylene as an overhead fraction, reducing the pressure on the liquid from the bottom of said zone to about 500 lbs. to 525 lbs. and introducing the same into a third fractionating zone, maintaining in said third zone an overhead temperature of from 95° F. to 100° F. and a bottom temperature of 140° F. to 230° F., the selected temperatures and pressures being adapted to the separation of the ethane as an overhead fraction, reducing the pressure of the liquid fraction from the bottom of said last zone to from 200 to 250 lbs. and introducing the same into the fourth fractionating zone, maintaining in said fourth zone an overhead temperature of about 100° F. and a bottom temperature of from 180° F. to 235° F., the selected temperatures and pressures being suited to the separation of propylene as an overhead vapor, reducing the pressure on the liquid from said last zone to from 145 lbs. to 150 lbs. and introducing the same into a fifth fractionating zone, maintaining in said last zone an overhead temperature of from 110° F. to 120° F. and a bottom temperature of from 200° F. to 275° F., the selected temperatures and pressures being suited to the separation of the butylene as an overhead fraction.

16. The process according to claim 15 in which the overhead temperatures in the first and second fractionating zones are obtained by a refrigerating cycle which comprises cooling the overhead vapors from said first zone by heat exchange with a liquid hydrocarbon capable of evaporating at a pressure slightly above atmospheric to produce a temperature of about —100° F., recondensing the refrigerant by heat exchange with evaporating liquid ammonia, cooling the overhead vapors from said second zone by heat exchange with evaporating liquid ammonia and condensing the ammonia from both heat exchange zones by heat exchange with cold water.

17. A system for separating gaseous olefines from gas mixtures containing said olefines and other hydrocarbon gases which comprises a first fractionating column, means compressing said gases, means pre-cooling the compressed gases and introducing the same into said column, means operating said column under conditions of temperature and pressure suited to separate the methane and lighter constituents as an overhead fraction, a second fractionating column, means supplying the liquid fraction from said first column to said second column, means operating said second column at conditions of temperature and pressure suited to the separation of ethylene as an overhead fraction, a third fractionating column, means introducing the liquid fraction from said second column into said third column, means operating said third column at conditions of temperature and pressure suited to the separation of propylene as an overhead fraction, a fourth fractionating column, means introducing the liquid fraction from said third column into said fourth column, means operating said fourth column under conditions of temperature and pressure suited to the separation of butylene as an overhead fraction, and an additional fractionating column located in the stream between said second and third fractionating columns, means supplying liquid from the bottom of said second column into said additional column and means supplying the liquid fraction from the bottom of said additional column into said third column and means operating said additional column at a temperature and pressure suited to the removal of ethane as an overhead fraction.

18. A system for separating gaseous olefines from gas mixtures containing said olefines and other hydrocarbon gases which comprises a first fractionating column, means compressing said gases, means pre-cooling the compressed gases and introducing the same into said column, means operating said column under conditions of temperature and pressure suited to separate the methane and lighter constituents as an overhead fraction, a second fractionating column, means supplying the liquid fraction from said first column to said second column, means operating said second column at conditions of temperature and pressure suited to the separation of ethylene as an overhead fraction, a third fractionating column, means introducing the liquid fraction from said second column into said third column, means operating said third column at conditions of temperature and pressure suited to the separation of propylene as an overhead fraction, a fourth fractionating column, means introducing the liquid fraction from said third column into said fourth column, means operating said fourth column under conditions of temperature and pressure suited to the separation of butylene as an overhead fraction, and reflux condensers connected to cool the overhead vapors from said first and second columns, said condensers being located above the tops of said columns in a position such that gravity return of the reflux condensate to the column is obtained, whereby the necessity for pumping the cold, high pressure reflux is avoided.

19. A system for separating gaseous olefines from gas mixtures containing said olefines and other hydrocarbon gases which comprises a first fractionating column, means compressing said gases, means pre-cooling the compressed gases and introducing the same into said column, means operating said column under conditions of temperature and pressure suited to separate the methane and lighter constituents as an overhead fraction, a second fractionating column, means supplying the liquid fraction from said first column to said second column, means operating said second column at conditions of temperature and pressure suited to the separation of ethylene as an overhead fraction, a third fractionating column, means introducing the liquid fraction from said second column into said third column, means operating said third column at conditions of temperature and pressure suited to the separation of propylene as an overhead fraction, a fourth fractionating column, means introducing the liquid fraction from said third column into said fourth column, means operating said fourth column under conditions of temperature and pressure suited to the separation of butylene as an overhead fraction, and reflux receivers mounted in the tops of the first and second fractionating columns, reflux condensers located above the level of said receivers and means connecting said receivers and condensers to the columns to obtain a gravity flow of the reflux from the condensers to the receivers and thence to the column tops.

CLINTON C. STEWARD.